United States Patent [19]

McGough

[11] Patent Number: 4,815,123
[45] Date of Patent: Mar. 21, 1989

[54] COIN-OPERATED TELEPHONE APPARATUS

[75] Inventor: Gerald B. McGough, Huntsville, Ala.

[73] Assignee: Palco Telecom, Inc., Nashville, Tenn.

[21] Appl. No.: 142,848

[22] Filed: Jan. 11, 1988

[51] Int. Cl.$^4$ ............................................. H04M 17/02
[52] U.S. Cl. ........................................ 379/153; 74/96
[58] Field of Search ............... 379/146, 150, 155, 153; 74/96, 105

[56] References Cited

U.S. PATENT DOCUMENTS 2,897,271  7/1959  Horn et al. ........................... 379/153

Primary Examiner—Stafford D. Schreyer
Attorney, Agent, or Firm—C. A. Phillips

[57] ABSTRACT

A coin-operated telephone having a housing enclosing a coin acceptor and an associated coin release mechanism which are positioned above a display area. A coin release actuator mechanism is mounted on top of the coin acceptor and includes a rocker arm which is pivoted downwardly by a coin release bar assembly which is secured to and extends across the interior of the housing and is pivoted downwardly by the coin release lever on the front of the housing. The assembly is located above the display area and provides ample clearance in the housing to later add "smart" features while also providing a large display area.

5 Claims, 2 Drawing Sheets

COIN-OPERATED TELEPHONE APPARATUS

TECHNICAL FIELD

This invention relates generally to coin-operated telephones and more particularly to a coin release mechanism for such coin-operated telephones.

BACKGROUND OF THE INVENTION

In the rapidly expanding customer-owned coin-operated telephone market, there are countless telephones to choose from, but few deliver the profitability owners want. Since profitability is only possible if the phones are frequently used, it is essential that the phones have a familiar appearance and be provided with user-friendly functions.

Typically, a housing with handset, hookswitch, dial, coin rejector, trigger switch, and coin relay hopper but not the chassis is sold to private paystation manufacturers for customizing to their products. Such customizing may include the installation of security devices which prevent unauthorized calls and entry, modular components which are located for easy servicing, LCD displays, and many other "smart" pay telephone features.

In an attempt to provide the customer with a familiar, user-friendly pay telephone having the above noted desirable features, a problem arose which concerned the use of a display in the upper instruction window. Because the position of the upper instruction window would cause the display to interfere with the coin release linkage mounted in the interior of the housing, it became necessary to design a new coin release mechanism.

It is, therefore, an object of the present invention to provide a coin-operated telephone with a housing having internal components positioned therein in a manner which will provide an extra large interior to permit add-on features to be installed while still maintaining a familiar, user-friendly appearance and function.

It is a further object of the present invention to provide such a telephone with a coin release mechanism which provides for positive actuation of the coin release mechanism of the coin acceptor from a position in the housing which will not interfere with the ability of the housing to later receive the add-on features and also provide unobstructed full width display windows.

SUMMARY OF THE INVENTION

A coin-operated telephone in which the internal coin release mechanism is located in a position which will permit add-on "smart" features to be later installed by a private owner. The telephone housing encloses a coin acceptor and associated coin release mechanism positioned above a display area. A coin release actuator mechanism is mounted on the top of the coin acceptor for actuating the coin release mechanism of the coin acceptor and includes a rocker arm which is disposed for downward pivotal movement by a coin release bar assembly which is secured to extends across the interior of the housing. The coin release bar assembly includes a spring biased, pivotally mounted, trip bar having an angled distal end which engages the rocker arm of the coin release actuator assembly in a wiping motion across a flat surface thereof to depress the release mechanism for operation of the coin acceptor to release defective coins therefrom.

DESCRIPTION OF THE PREFERRED EMBODIMENT

Figure 1:
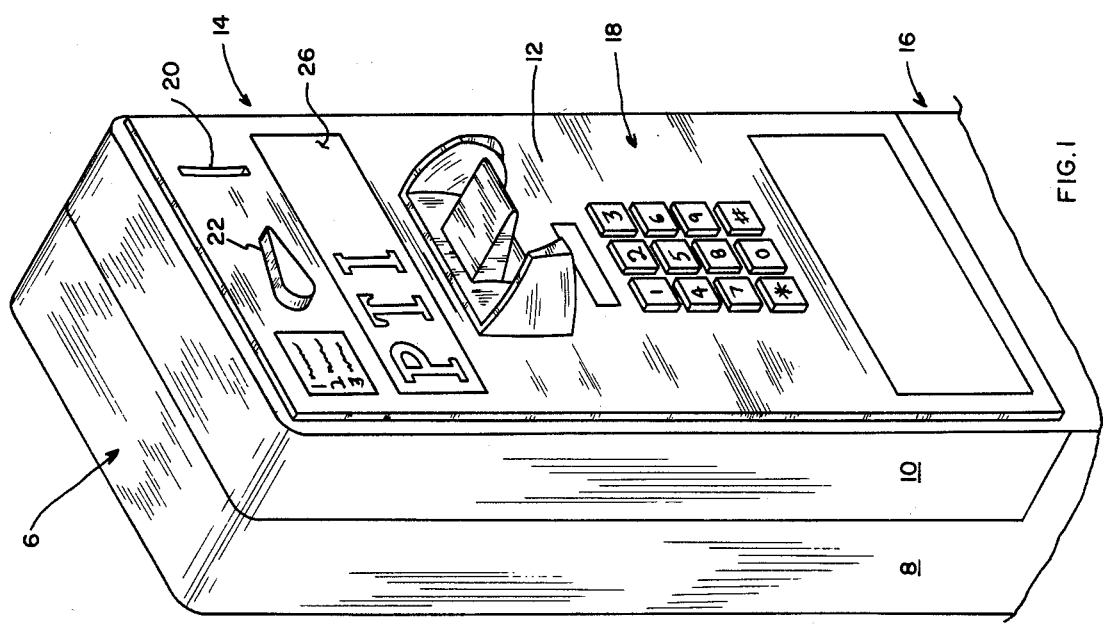
FIG. 1 is a front pictorial view of a coin-operated telephone illustrating the positions of the coin slot, the coin return actuating lever, and the display area.
Figure 4:
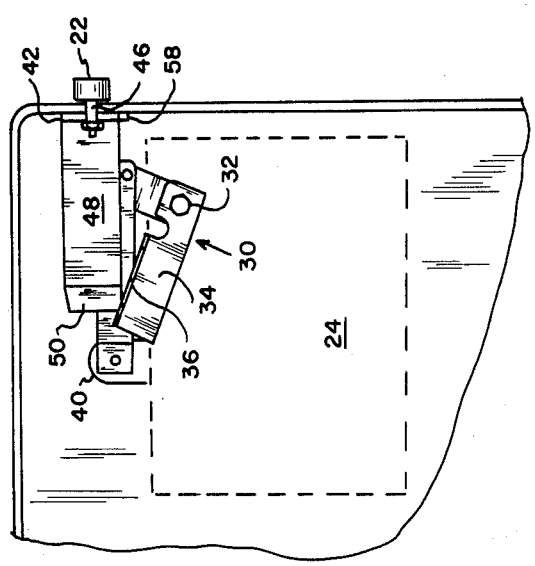
FIG. 4 is a side elevational view of the coin acceptor and coin release mechanism.

As seen in FIG. 1, a coin-operated telephone includes a housing 6 having a pair of releasably attached sections 8 and 10. Section 10 includes a forward face 12, an upper coin receiving and display area 14, and a lower coin storage area 16. A central handset and dial area 18 is provided intermediate areas 14 and 16. Upper area 14 includes a slot 20 for receiving coins and a lever 22 for actuating a coin release mechanism of a coin acceptor 24 (FIG. 3) for returning stuck coins. A display area 26 is provided in upper area 14. Any of many types of displays may be used, such as LED's, to provide information, instructions, etc. The display area may also be used as a card insert panel and LCD display screen which enhances the use of a credit card or "smart" card. In any event, it is desired that the display area be as large as possible and unobstructed by internal components housed in the housing.

Figure 3:
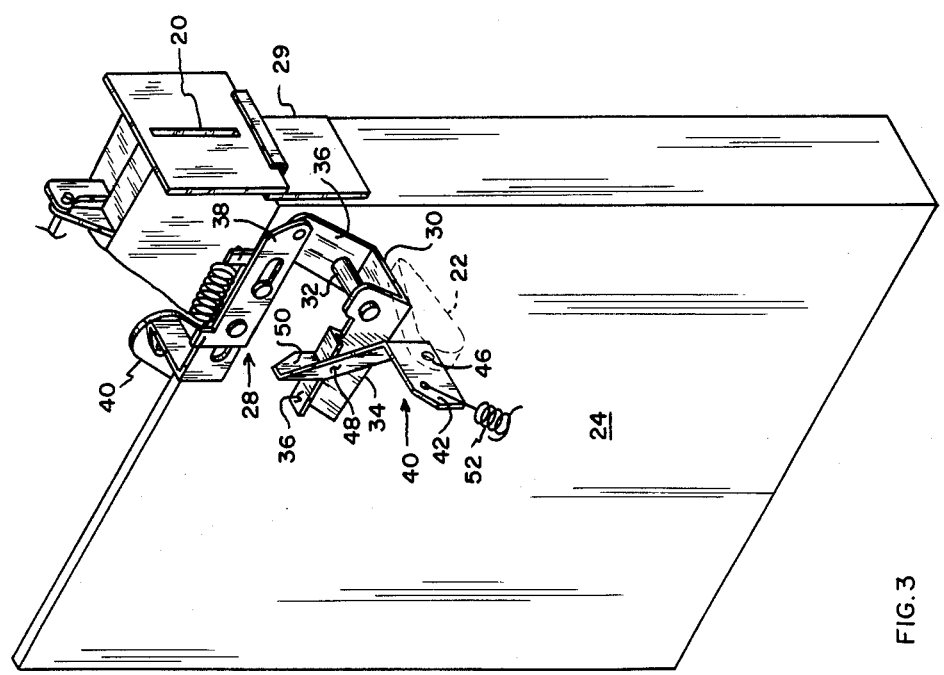
FIG. 3 is a pictorial view of a coin release mechanism of the present invention for operation of the release mechanism.

As seen in FIG. 3, coin acceptor 24 is provided with a coin release mechanism assembly 28 at the top 29 thereof. A coin release actuating mechanism assembly including a rocker arm 30 is also pivotally mounted at the top 29 of the coin acceptor. The rocker arm is secured by a pin 32 to the top 29 of coin acceptor 24. The rocker arm is disposed for pivotal movement to displace linkage associated with the coin release mechanism assembly 28 of the coin acceptor for effecting release of the inserted stuck coins in a manner well known in the art. The coin acceptor may be any of many commercially available acceptors. A typical acceptor is manufactured by COINCO of St. Louis, Mo. Rocker arm 30 includes a pair of substantially parallel spaced sides 34 and 36. Pin 32 extends through both sides to secure rocker arm 30 to top 29 of the coin acceptor. A bar 38 of coin rlease mechanism assembly 28 is secured in biased relation between rocker arm 30 and a lever 40 of the coin acceptor. Rocker arm 30 is provided with a flat flanged surface 36 which extends from side 34 of member 30.

Figure 2:
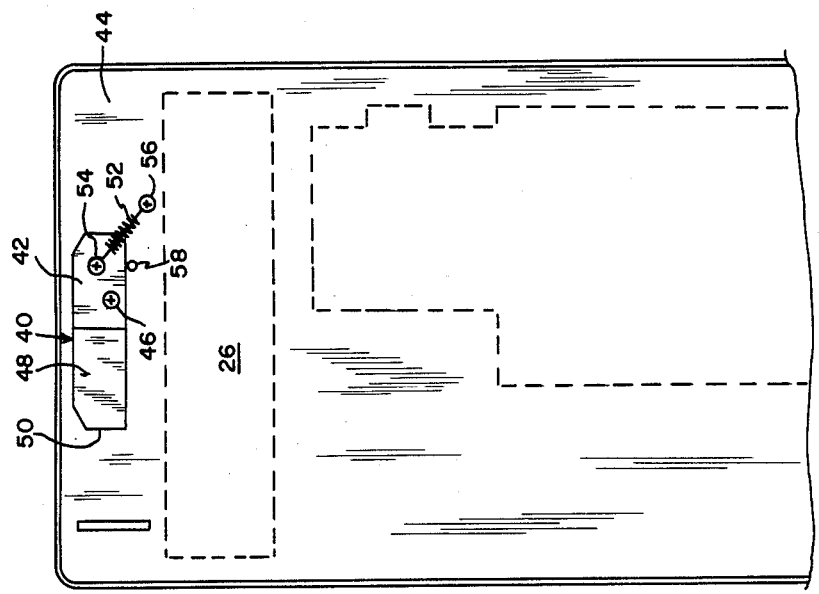
FIG. 2 is a rear elevational view of the interior of the housing and illustrating the positions of the coin release mechanism and the display area.

To provide for actuating the coin release mechanism assembly 28 by downward pivotal movement of rocker arm 30, an actuating bar assembly 40 is secured in the interior of the housing for pivotal movement by lever 22. Actuator assembly 40 includes a flat back plate 42 (FIGS. 2 and 3) which is pivotally secured to a surface 44 on the back side of face 12 of the housing by a pin 46 which also connects to lever 22. An arm portion 48 of the bar assembly extends away from the interior back side surface 44 of the housing and is provided at its distal end with an angled rocker arm engaging section 50 which is disposed for engagement with flat flanged surface 36 of the rocker arm. A spring 52 is secured to a pin 54 on flat back plate 42 and to a pin 56 on the interior surface 44 of the housing. A stop 58 is secured to surface 44 adjacent to a lower surface 60 of the flat back plate 42 to retain the actuator assembly in a horizontal position.

To retrieve the coins, the customer depresses lever 22, which pivots the angled section 50 of the distal end of arm 48 downwardly in engagement with the surface of flanged section 36 of rocker arm 30 in a smooth oblique angular "wiping" motion. As angled section 50 is slidably moved across surface 36, the coin release is actuated for return of stuck coins in a manner well known in the art.

It should be seen that the applicant has provided a simple mechanism for actuating a coin release mechanism of a coin-operated telephone. It should also be seen that in addition to providing for the operation of the coin release mechanism, the mechanism is positioned and routed in the telephone housing in such a manner as to provide for a large unobstructed display area while maintaining the familiar user-friendly appearance of the telephone.

I claim:

1. A coin-operated telephone comprising:
   a housing having a pair of sections disposed for releasable engagement, a first of said sections having a face and upper, lower, and intermediate sections and a display area disposed in said upper section, said display area extending substantially across the width of said housing, said second of said sections having an upper portion for receiving said first of said sections and a lower coin storage section;
   a coin acceptor and associated release mechanism mounted in said first of said housing sections, said coin acceptor and associated release mechanism having a rocker arm assembly secured thereto for actuating said coin release mechanism; and
   an actuating bar assembly secured to the interior surface of said face above said display window in unobstructed relationship therewith, said bar assembly including a member having a flat back plate section pivotally secured to the interior surface of said face of said first of said housing sections above said display area, an arm section extending outwardly from said flat back plate section and into the interior of said housing, a distal end section disposed in angled relation with said extending arm section and disposed for operative engagement with said rocker arm for mating in an oblique angular relation therewith for actuating said coin release mechanism, a lever mounted on said face of said first of said housing sections in said upper section thereof, said lever secured to said back plate of said bar assembly for pivotal movement thereof, and biasing means secured to said actuator assembly and to said interior surface of said housing for biased relation of said actuator assembly and said housing.

2. Apparatus as in claim 1 wherein said rocker arm assembly is pivotally mounted to an upper portion of said coin acceptor and disposed for pivotal movement for actuation of said coin release mechanism of said coin acceptor for release of stuck coins therefrom, said rocker arm assembly having a flanged portion extending therefrom, said flanged portion having a flat surface thereon.

3. Apparatus as in claim 2 wherein said angled section of said distal end of said extending arm section includes a lower surface disposed for engagement at an oblique angle with said flat surface of said rocker arm, said lower surface disposed for moving across said flat surface in a wiping motion while depressing said rocker arm responsive to a pivotal movement being applied to said lever.

4. Apparatus as in claim 1 wherein said biasing means is a spring having one end thereof secured to said back plate and a second end secured to said housing.

5. Apparatus as in claim 4 including stop means mounted in said housing adjacent to a lower surface of said flat back plate.

* * * * *